United States Patent
Guey et al.

(10) Patent No.: US 9,094,906 B2
(45) Date of Patent: Jul. 28, 2015

(54) MULTI-STAGE TIMING AND FREQUENCY SYNCHRONIZATION

(71) Applicants: Jiann-Ching Guey, Chutung (TW); Jung-Fu Cheng, Fremont, CA (US); Havish Koorapaty, Saratoga, CA (US)

(72) Inventors: Jiann-Ching Guey, Chutung (TW); Jung-Fu Cheng, Fremont, CA (US); Havish Koorapaty, Saratoga, CA (US)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 190 days.

(21) Appl. No.: 13/659,310

(22) Filed: Oct. 24, 2012

(65) Prior Publication Data

US 2013/0121246 A1    May 16, 2013

Related U.S. Application Data

(60) Provisional application No. 61/558,696, filed on Nov. 11, 2011.

(51) Int. Cl.
*H04L 27/26* (2006.01)
*H04W 56/00* (2009.01)

(52) U.S. Cl.
CPC ......... *H04W 56/001* (2013.01); *H04L 27/2657* (2013.01); *H04L 27/2662* (2013.01); *H04L 27/2675* (2013.01); *H04L 27/2686* (2013.01);
(Continued)

(58) Field of Classification Search
CPC ............ H04L 27/2602; H04L 27/2649; H04L 27/2675; H04L 7/00; H04L 7/0079; H04L 7/042; H04W 72/0406; H04W 76/04; H04W 56/00

USPC ......... 370/350, 330, 503, 255, 326, 336, 342, 370/343, 344, 347, 479, 480, 516
See application file for complete search history.

(56) References Cited

U.S. PATENT DOCUMENTS 5,889,759 A * 3/1999 McGibney .................... 370/207
6,263,031 B1 * 7/2001 Beidas et al. ................. 375/343
(Continued)

FOREIGN PATENT DOCUMENTS

EP     2071791 A1    6/2009
WO   2008026891 A1    3/2008

OTHER PUBLICATIONS

3rd Generation Partnership Project. "Further details on Synchronization and Measurements on Additional Carrier Types." 3GPP TSG RAN WG1 Meeting #67, R1-113676, San Francisco, USA, Nov. 14-18, 2011.
(Continued)

*Primary Examiner* — Benjamin H Elliott, IV
*Assistant Examiner* — Eric Nowlin
(74) *Attorney, Agent, or Firm* — Coats and Bennett, PLLC

(57) ABSTRACT

According to exemplary embodiments of the invention, timing and frequency offset estimation is divided into two or more stages. In each stage, a different subset of the available reference symbols is selected to perform timing synchronization, frequency synchronization, or joint timing and frequency synchronization. In each non-final stage, a respective set of the reference symbols is used to perform timing synchronization or frequency synchronization in order to narrow the uncertainty window for the timing or frequency offset, and thus reduce the search space for the final stage. In the final stage, a different set of reference symbols may be used to perform joint timing and frequency synchronization over the reduced search space.

18 Claims, 9 Drawing Sheets

(52) U.S. Cl.
CPC .......... *H04W 56/00* (2013.01); *H04W 56/0035* (2013.01)

(56) References Cited

U.S. PATENT DOCUMENTS

| | | | | |
|---|---|---|---|---|
| 6,363,131 | B1* | 3/2002 | Beidas et al. | 375/368 |
| 6,381,225 | B1* | 4/2002 | Chockalingam et al. | 370/316 |
| 6,678,339 | B1* | 1/2004 | Lashkarian | 375/341 |
| 7,778,336 | B1* | 8/2010 | Toumpakaris et al. | 375/260 |
| 8,174,958 | B2* | 5/2012 | Kent | 370/208 |
| 8,223,891 | B2* | 7/2012 | Kent | 375/326 |
| 8,559,296 | B2* | 10/2013 | Kent | 370/208 |
| 2002/0196731 | A1 | 12/2002 | Laroia et al. | |
| 2003/0112743 | A1* | 6/2003 | You et al. | 370/203 |
| 2004/0052228 | A1* | 3/2004 | Tellado et al. | 370/334 |
| 2004/0202234 | A1* | 10/2004 | Wang | 375/149 |
| 2006/0133526 | A1* | 6/2006 | Zhang et al. | 375/260 |
| 2007/0153930 | A1 | 7/2007 | Reid | |
| 2008/0043882 | A1* | 2/2008 | Zhang et al. | 375/316 |
| 2010/0260294 | A1* | 10/2010 | Zhengang et al. | 375/343 |
| 2010/0329405 | A1* | 12/2010 | Chen et al. | 375/371 |
| 2011/0237214 | A1* | 9/2011 | Swarts et al. | 455/226.1 |
| 2012/0093267 | A1* | 4/2012 | Zhou et al. | 375/343 |

OTHER PUBLICATIONS

3rd Generation Partnership Project. "Further details on design principles for additional carrier types." 3GPP TSG RAN WG1 Meeting #67, R1-113675, San Francisco, USA, Nov. 14-18, 2011.

3rd Generation Partnership Project. "3rd Generation Partnership Project; Technical Specification Group Radio Access Network; Evolved Universal Terrestrial Radio Access (E-UTRA); Physical Channels and Modulation (Release 11)." 3GPP TS 36.211, V11.1.0, Dec. 2012, Sophia Antipolis Valbonne, France.

* cited by examiner

MULTI-STAGE TIMING AND FREQUENCY SYNCHRONIZATION

RELATED APPLICATION

This application claims the benefit of U.S. Provisional Patent Application Ser. No. 61/558,696 filed Nov. 11, 2011, which is incorporated herein by reference.

TECHNICAL FIELD

The present invention relates generally to wireless communication networks and, more particularly, to synchronization between a transmitting device and a receiving device in a wireless communication network.

BACKGROUND

In a wireless communication system, it is necessary to synchronize timing and frequency offsets between the transmitting and receiving devices in order for the receiving device to perform data demodulation. Timing and frequency synchronization is commonly achieved by the transmission of known synchronization signals from the transmitting device and the detection of the synchronization signal by the receiving device. The synchronization signal should preferably have characteristics that are suitable for accurate detection of timing and frequency offsets resulting from the location of the receiving device, propagation channel and receiver oscillator offset.

In Long Term Evolution (LTE) systems, the base station transmits two synchronization signals on the downlink: the Primary Synchronization Signal (PSS) and the Secondary Synchronization Signal (SSS). Joint timing and frequency synchronization is performed using the PSS and SSS to obtain estimates of the timing and frequency offsets. Denoting the timing offset as $\tau$ and the frequency offset as $v$, the joint timing and frequency estimator searches for the pair $(\tau,v)$ that maximizes a metric. To perform a complete search, the joint timing and frequency estimator computes the metric for each possible pair $(\tau,v)$ and selects the one that maximizes the metric as its estimate of the timing and frequency offsets.

Synchronization performance can be improved by using other reference symbols transmitted by the base station in combination with the PSS and SSS for timing and frequency synchronization. For example, common reference signals (CRSs) and channel state information reference signals (CSI-RSs) transmitted by the base station can be used by an access terminal for timing and frequency synchronization along with the PSS and SSS to improve the accuracy of the timing and frequency offset estimates.

One problem encountered in performing joint timing and frequency synchronization is the complexity of the search. When the uncertainty windows for the timing and frequency offsets are large, the complexity of the search will increase and more memory and/or processing resources will be needed to perform a complete search. Compounding this problem, when different types of reference signals are combined for timing and frequency synchronization, some of the signals may increase uncertainty for the timing and/or frequency offsets and thus increase the complexity of the search.

SUMMARY

In exemplary embodiments of the invention, timing and frequency offset estimation is divided into two or more stages. In each stage, a different subset of the available reference symbols is selected to perform timing synchronization, frequency synchronization, or joint timing and frequency synchronization. In each non-final stage, a respective set of the reference symbols is used to perform timing synchronization or frequency synchronization in order to narrow the uncertainty window for the timing or frequency offset, and thus reduce the search space for the final stage. In the final stage, a different set of reference symbols may be used to perform joint timing and frequency synchronization over the reduced search space.

The reference symbols in each subset may comprise any combination of reference symbols selected from the available reference signals. For example, reference symbols best suited for timing synchronization may be selected for one stage, and reference symbols best suited for frequency synchronization may be selected for another stage. The reference symbols in the final stage may comprise some, all, or none of the reference symbols in the previous stages.

Exemplary embodiments of the invention comprise methods implemented by an access terminal for timing and frequency synchronization. In one exemplary method, the access terminal receives one or more reference signals transmitted by a base station. Timing and frequency offset estimation is performed in multiple stages. In one or more non-final stages, the access terminal reduces the search space for joint timing and frequency offset estimation. The search space may be reduced by performing timing offset estimation using a first set of reference symbols selected from the reference signals, performing frequency offset estimation using a second set of reference symbols selected from the reference signals, or both. In the final stage, joint timing and frequency offset estimation is performed over the reduced search space using a third set of reference symbols.

Other embodiments of the invention comprise an access terminal configured to perform multi-stage timing and frequency offset estimation. The access terminal comprises a transceiver circuit for receiving one or more reference signals from a base station, and a processing circuit processing configured to perform multi-stage timing and frequency synchronization. The processing circuit is configured to reduce a search space for timing and frequency offsets by performing timing offset estimation based on a first set of reference symbols selected from said one or more reference signals, performing frequency offset estimation based on a second set of reference symbols selected from said one or more reference signals, or both. The processing circuit is further configured to perform joint timing and frequency offset estimation over said reduced search space using a third set of reference symbols selected from said one or more reference signals to obtain estimates of said timing and frequency offsets.

Embodiments of the present invention can improve the accuracy of timing and frequency offset estimation without greatly increasing complexity of the search. The use of the additional reference signals increases the accuracy of the timing and frequency offset estimates. Reducing the search space for the timing and/or frequency offsets in the non-final stages reduces the complexity of the search.

DETAILED DESCRIPTION

Figure 1:
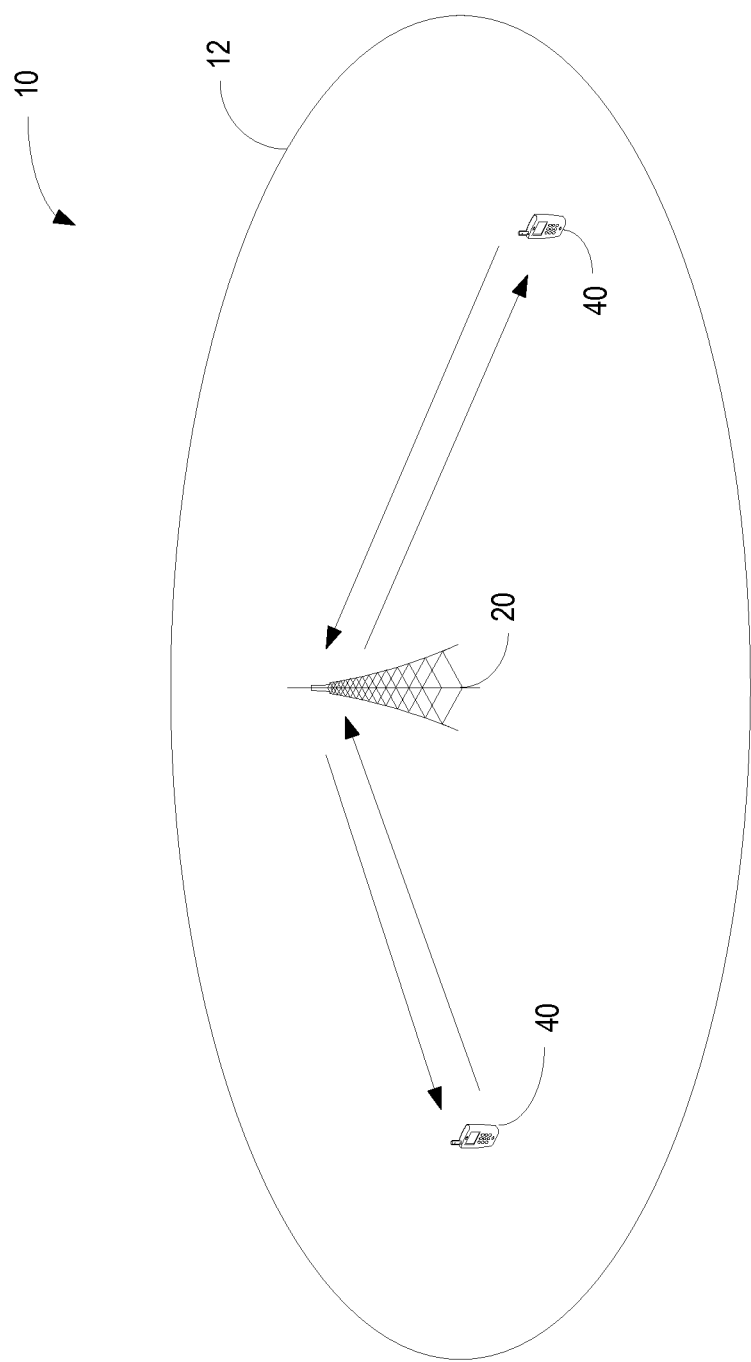
FIG. 1 illustrates an exemplary wireless communication network implementing timing and frequency synchronization as herein described.

Turning now to the drawings, FIG. 1 illustrates an exemplary communication network 10 according to one exemplary embodiment of the present invention. The communication network 10 comprises a plurality of cells 12, though only one cell 12 is shown in FIG. 1. A base station 20 within each cell 12 communicates with access terminals 40 within the cell 12. The base station 20 transmits data to the access terminals 40 over a downlink channel for downlink communications, and receives data from the access terminals 40 over an uplink channel for uplink communications.

For illustrative purposes, an exemplary embodiment of the present invention will be described in the context of a Long Term Evolution (LTE) system. Those skilled in the art will appreciate, however, that the present invention is more generally applicable to other OFDM systems, such as WiMAX (IEEE 802.16) systems.

Figure 2:
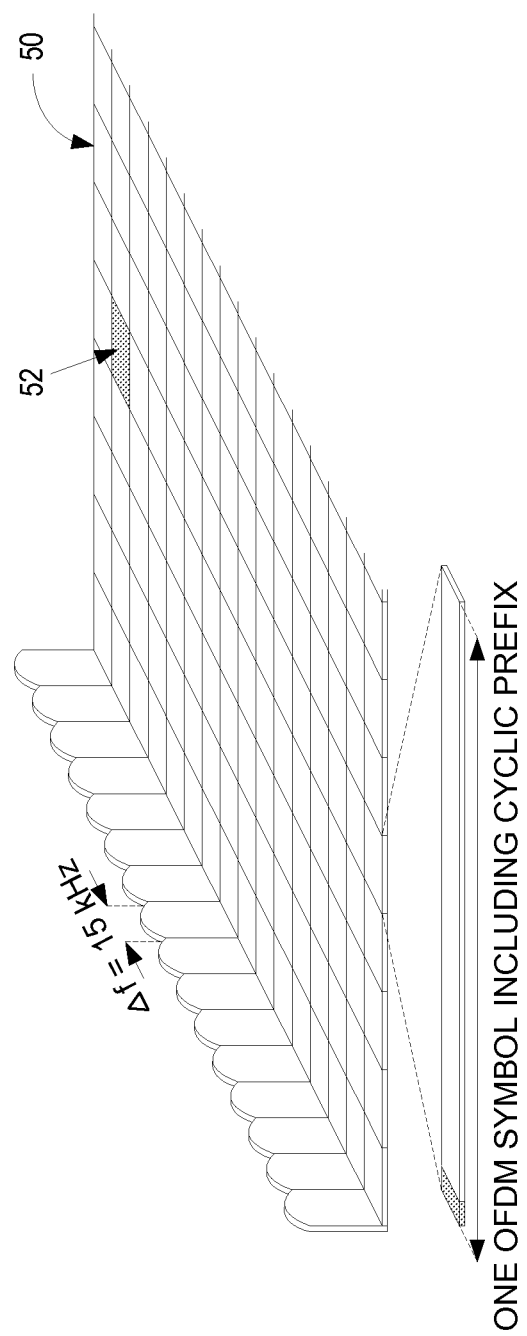
FIG. 2 illustrates a timing-frequency grid for an OFDM (Orthogonal Frequency Division Multiplexing) network.

LTE uses Orthogonal Frequency Division Multiplexing (OFDM) in the downlink and Discrete Fourier Transform (DFT) spread OFDM in the uplink. The available radio resources in LTE systems can be viewed as a timing-frequency grid. FIG. 2 illustrates a portion of an exemplary OFDM timing-frequency grid 50 for LTE. Generally speaking, the timing-frequency grid 50 is divided into one millisecond subframes. Each subframe includes a number of OFDM symbols. For a normal cyclic prefix (CP) length, suitable for use in situations where multipath dispersion is not expected to be extremely severe, a subframe comprises fourteen OFDM symbols. A subframe comprises twelve OFDM symbols if an extended cyclic prefix is used. In the frequency domain, the physical resources are divided into adjacent subcarriers with a spacing of 15 kHz. The number of subcarriers varies according to the allocated system bandwidth. The smallest element of the timing-frequency grid 50 is a resource element 52. A resource element 52 comprises one OFDM subcarrier during one OFDM symbol interval.

Figure 3:
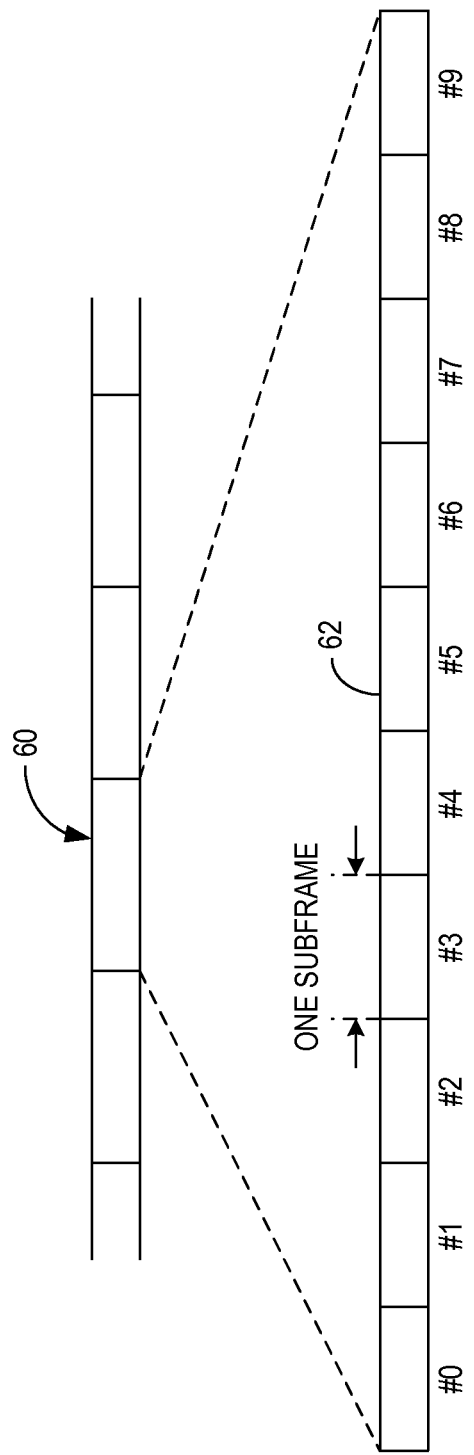
FIG. 3 illustrates time domain structure in an exemplary OFDM network.

As shown in FIG. 3, the downlink transmissions are organized into 10 ms radio frames 60. Each radio frame comprises ten equally-sized subframes 62, which for purposes of discussion are numbered 0-9.

Resources for the downlink transmissions are allocated in units called resource blocks (RBs). Each resource block spans twelve subcarriers (which may be adjacent or distributed across the frequency spectrum) and one 0.5 ms slot (one half of one subframe). Thus, a resource block comprises 84 resource elements for the normal cyclic prefix. The term "resource block pair" refers to two consecutive resource blocks occupying an entire 1 ms subframe.

In order to establish a connection with the LTE network, the access terminal 40 needs to synchronize with the base station in timing and frequency. The base station 20 transmits two reference signals, the primary synchronization signal (PSS) and a secondary synchronization signal (SSS), to facilitate cell search timing and frequency synchronization by the access terminal 40. For frequency division duplexed (FDD) operations, the SSS and PSS are transmitted within the last 2 OFDM symbols in the first slot of subframes 0 and 5. For timing division duplexing (TDD) operations, the SSS is transmitted in the second last OFDM symbol of the first slot in subframes 0 and 5, and the PSS is transmitted in the third OFDM symbol of subframes 1 and 6. The PSS and SSS are transmitted in the center of the system bandwidth, occupying 6 resource blocks in the frequency domain. The access terminal 40 can perform joint timing and frequency synchronization using the PSS and SSS to estimate the timing and frequency offsets.

The access terminal 40 can use other reference signals transmitted by the base station to improve the accuracy of the timing and frequency offset estimates. For example LTE networks use several different types of downlink reference signals including common reference signals (CRSs), demodulation reference signals (DM-RSs), and channel state information reference signals (CSI-RSs).

The CRS is transmitted in every downlink subframe and in every resource block in the frequency domain, thus covering the entire cell bandwidth. The CRS can be used by the access terminal 40 to perform channel estimation for coherent demodulation. The CRS can also be used by the access terminal 40 to acquire channel state information (CSI). Measurements on the CRS may also be used for cell selection and handover decisions.

Demodulation reference signals (DM-RSs), sometimes referred to as access terminal-specific reference signals, are intended for use by a specific access terminal 40 or group of access terminals 40. The DM-RS is therefore transmitted only within the resource blocks used for downlink transmissions to the specific access terminal 40 or group of access terminals 40 on the Physical Downlink Shared Channel (PDSCH).

CSI reference signals are intended for use by access terminals 40 to acquire channel state information in the case when demodulation reference signals are used for channel estimation, such as when non-codebook-based precoding is being utilized. Because DM-RSs are precoded along with their associated downlink transmissions, the precoded DM-RS can be used by a receiving device to demodulate and recover transmitted layers without the receiving device being explicitly informed of the specific precoding that is applied on the transmitting side. In such cases, it may still be desirable for the receiving device to signal precoder recommendations to the base station. Because DM-RSs are themselves precoded, they can only be used to estimate the equivalent channel experienced by the precoded layer (including any precoding), not the physical channel. As a result, in such scenarios, terminal-specific CSI-RSs may be used for channel estimation as part of the procedure for generating CSI. For example, CSI-RS are used by UEs to generate CSI when transmission mode 9 (which, as defined in Release 10 of LTE, provides non-codebook-based precoding for transmissions of up to eight layers) is utilized in an LTE network. The CSI-RS has a significantly lower timing/frequency density than the CRS and is therefore more efficient in the case of a reference signal only targeting CSI. Additionally, because the timing/frequency allocation of CSI-RSs can be selectively configured, using CSI-RSs for CSI generation in such scenarios can result in significant flexibility.

In exemplary embodiments of the invention, multiple reference signals are used for timing and frequency offset estimation to improve the accuracy of the timing and frequency offset estimates. The estimation process is divided into two or more stages. In each stage, a different subset of the available reference symbols is selected to perform timing synchronization, frequency synchronization, or joint timing and frequency synchronization. In the non-final stages, timing and/or frequency synchronization may be performed to reduce the uncertainty windows in the timing and/or frequency domains. Joint timing and frequency synchronization over the reduced search space is then performed in the final stage.

The reference signals used for timing and frequency synchronization can be modeled as:

$$s(t) = s_0(t) \cup \ldots s_{N-1}(t) \qquad \text{Eq. (1)}$$

where s(t) represents the complete set of all available reference symbols in the reference signals used for synchronization, $s_i(t)$ represents a subset of the reference symbols for stage i, and N represent the number of stages. After passing through the propagation channel, the synchronization signal reaching the receiving device can be expressed as:

$$r(t) = h \cdot s(t-\tau)e^{j2\pi vt} + z(t) \qquad \text{Eq. (2)}$$

where is h the complex channel gain, τ is the timing offset and v is the frequency offset and z(t) is the noise.

In order to perform coherent demodulation of data transmission, the receiver needs to estimate the timing offset τ and frequency offset v respectively. A typical timing-frequency offset estimator is given by:

$$(\hat{\tau}, \hat{v}) = \underset{\tau_{min} \leq \tau \leq \tau_{max}, v_{min} \leq v \leq v_{max}}{\operatorname{argmax}} \left| \int r(t) \cdot s^*(t-\tau)e^{-j2\pi vt} dt \right|^2 \qquad \text{Eq. (3)}$$

where $\tau_{min}$ and $\tau_{max}$ are the lower and upper limits of timing offset uncertainty and $v_{min}$ and $v_{max}$ are the lower and upper limit of frequency offset uncertainty. Essentially, the estimator computes a metric for each possible hypothesized value of (τ,v) and selects the value having the largest metric as the estimate. The exemplary metric given is the correlation between the received signal and the complex conjugate of the transmitted signal shifted in timing and frequency in the hypothesized amount. Other metrics such as mean square error can also be employed, but the basic procedure remains the same.

Figure 4:
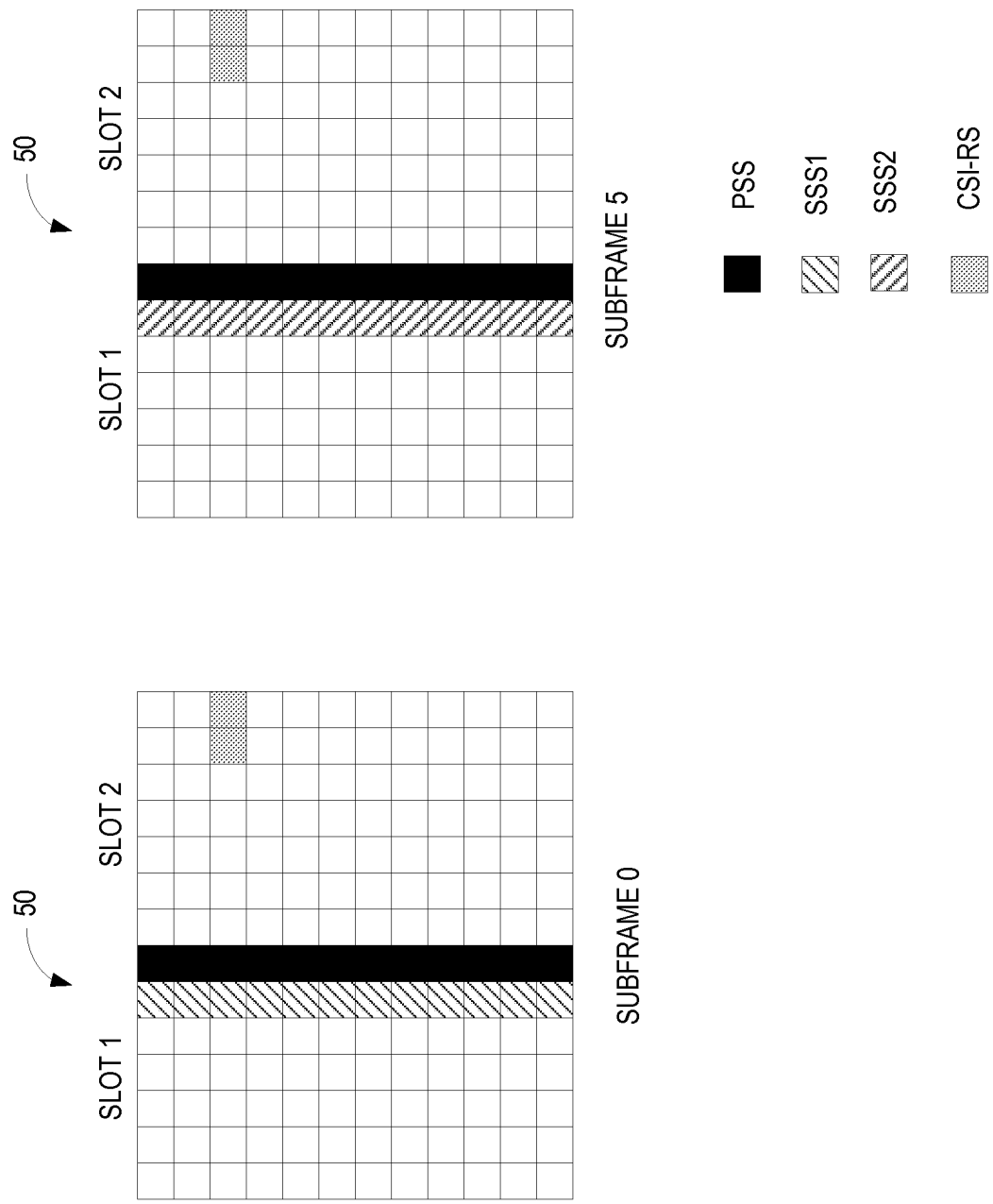
FIG. 4 illustrates an exemplary set of reference symbols used for timing and frequency synchronization.

FIG. 4 illustrates an exemplary set of reference signals, including PSS, SSS and CSI-RS. The PSS and SSS are included in every fifth subframe and in the 6 central RBs, and in some embodiments may be used for timing offset estimation. The periodicity of the CSI-RS is variable. The maximum periodicity is once every 5 subframes and the periodicity can be reduced up to once every 160 subframes. Multiple instances of the CSI-RS can be allocated within one subframe or in consecutive subframes to increase the density of the CSI-RS. This increased density makes it useful for frequency offset estimation in some embodiments. The PSS, SS, SSS and also the CSI-RS may be used for joint timing and frequency offset estimation.

Figure 5:
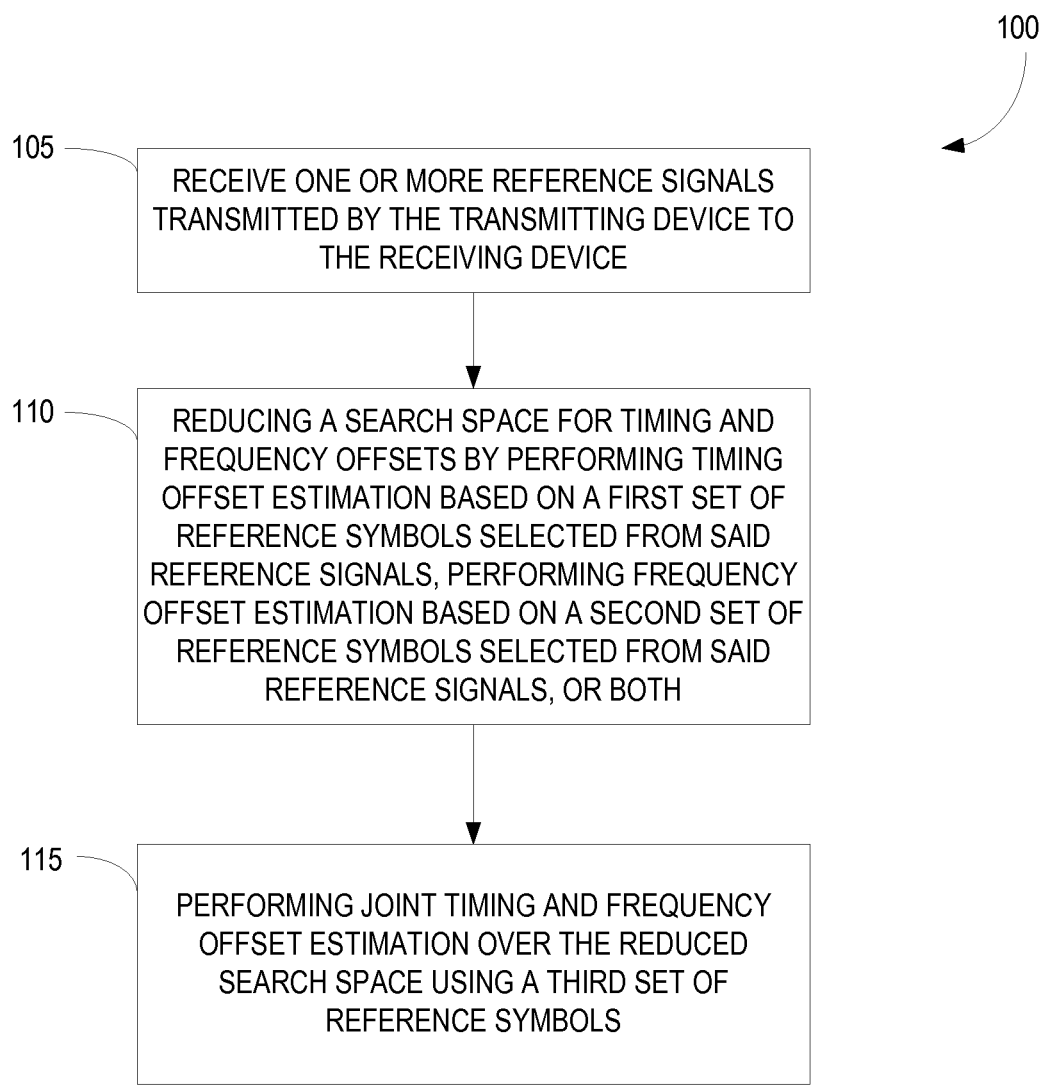
FIG. 5 illustrates a generalized method of timing and frequency synchronization according to one embodiment.

FIG. 5 illustrates a generalized estimation procedure 100 for generating timing and frequency offset estimates according to one exemplary embodiment. To begin the procedure 100, the access terminal 40 receives one or more reference signals transmitted by the base station (block 105). The term "reference signal" as used herein refers to any type of signal containing known symbols that is used as a reference for synchronization, channel estimation, or other purposes by the access terminal 40. The term "reference signal" includes without limitation the PSS, SSS, CRS, DM-RS, and CSI-RS. In the non-final stage or stages, an estimator in the access terminal reduces the search space for joint timing and frequency offset estimation (block 110). The search space may be reduced by performing timing offset estimation using a first set of reference symbols selected from the reference signals, performing frequency offset estimation using a second set of reference symbols selected from the reference signals, or both. In the final stage, joint timing and frequency offset estimation is performed over the reduced search space using a third set of reference symbols (block 115).

Figure 6:
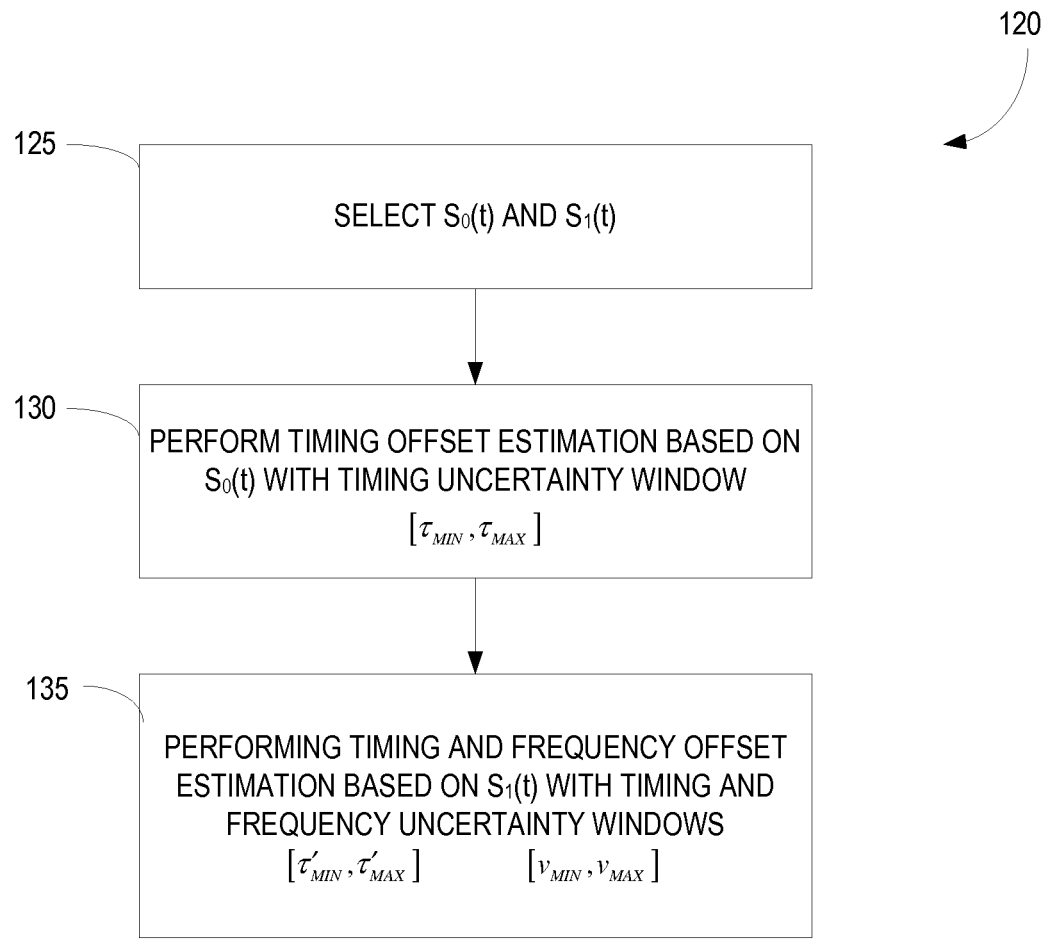
FIG. 6 illustrates a method of timing and frequency synchronization according to one embodiment including a first stage for reducing the timing uncertainty window.

FIG. 6 shows an exemplary two-stage estimation procedure 120 according to one embodiment. In the first stage, timing synchronization is performed using a first subset $s_0(t)$ of reference symbols to narrow the timing uncertainty window. In the second stage, joint timing and frequency synchronization is performed over the reduced search space using a second subset of reference symbols $s_1(t)$ to determine the timing and frequency offset estimates.

The procedure 120 begins with the selection of the first and second reference symbol subsets $s_0(t)$ and $s_1(t)$ (block 125). The second subset $s_1(t)$ may comprise some, all, or none of the reference symbols in the first subset $s_0(t)$. In one embodiment for an LTE system, the first subset of reference symbols $s_0(t)$ may comprise the reference symbols in the PSS and SSS received over one or more frames. The second subset of reference symbols $s_1(t)$ may comprise the combination of the PSS/SSS and CSI-RS received over the same period. Timing synchronization is then performed in the first stage to narrow the timing offset uncertainty window (block 130). The timing synchronization performed in the first stage is given by:

$$\hat{\tau} = \underset{\tau_{min} \leq \tau \leq \tau_{max}}{\operatorname{argmax}} \left| \int r(t) \cdot s_0^*(t-\tau) dt \right|^2 \qquad \text{Eq. (4)}$$

Joint timing and frequency synchronization is then performed in the second stage over a reduced search space to obtain the final estimates of the timing and frequency offsets (block 135). The joint timing and frequency synchronization performed in the second stage is given by:

$$(\hat{\tau}, \hat{v}) = \underset{\tau'_{min} \leq \tau \leq \tau'_{max}, v_{min} \leq v \leq v_{max}}{\operatorname{argmax}} \left| \int r(t) \cdot s_1^*(t-\tau)e^{-j2\pi vt} dt \right|^2 \qquad \text{Eq. (5)}$$

As shown in Eq. (5), the search window in the timing domain is reduced. Joint timing and frequency estimation in the second stage is performed over the reduced uncertainty window denoted by $[\tau'_{min} \leq \hat{\tau} \leq \tau'_{max}]$. The values $\tau'_{min}$ and $\tau'_{max}$ may be computed according to:

$$\tau'_{min} = \hat{\tau} - \Delta\tau \qquad \text{Eq. (6)}$$

$$\tau'_{max} = \hat{\tau} + \Delta\tau \qquad \text{Eq. (7)}$$

where Δτ is a residual uncertainty factor for the timing uncertainty. The reduced timing uncertainty window $[\tau'_{min} \leq \hat{\tau} \leq \tau'_{max}]$ may be a single value representing a complete resolution of the timing offset uncertainty, in which case the residual uncertainty Δτ equals 0.

Figure 7:
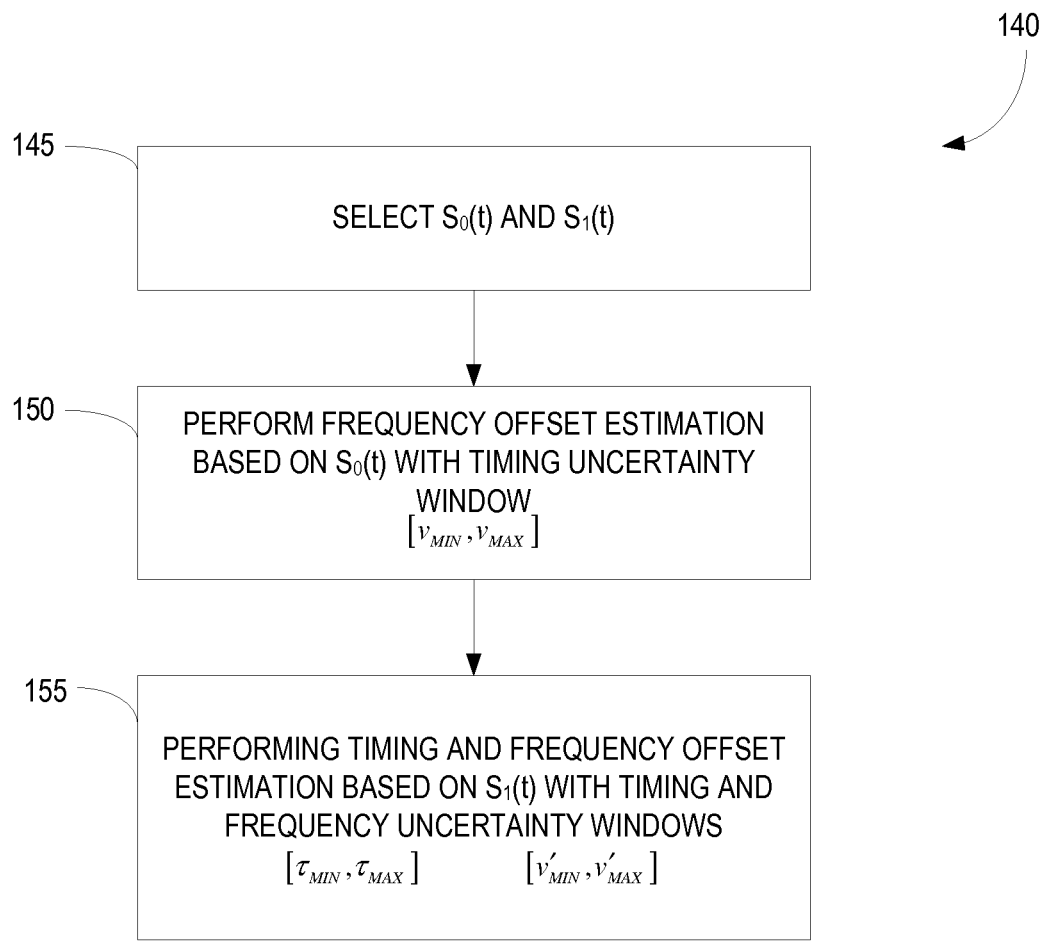
FIG. 7 illustrates a method of timing and frequency synchronization according to one embodiment including a first stage for reducing the frequency uncertainty window.

FIG. 7 shows an exemplary estimation procedure 140 according to another exemplary embodiment. In this embodiment, the estimation process is also divided into two stages. In the first stage, frequency synchronization is performed using a first subset $s_0(t)$ of reference symbols to narrow the frequency uncertainty window. In the second stage, joint timing and frequency synchronization is performed over the reduced search space using a second subset of reference symbols $s_1(t)$ to determine the timing and frequency offset estimates.

The procedure 140 begins with the selection of the first and second reference symbol subsets $s_0(t)$ and $s_1(t)$ (block 145). The second subset $s_1(t)$ may comprise some, all, or none of the reference symbols in the first subset $s_0(t)$. For example, the first subset of reference symbols $s_0(t)$ may comprise the reference symbols in the CSI-RS symbols received over a predetermined period. The second subset of reference symbols $s_1(t)$ may comprise the combination of the PSS/SSS and CSI-RS over the same period. Frequency synchronization is then performed in the first stage to narrow the timing offset uncertainty window (block 150). The frequency synchronization performed in the first stage is given by:

$$\hat{v} = \underset{v_{min} \leq v \leq v_{max}}{\operatorname{argmax}} \left| \int r(t) \cdot s_1^*(t) e^{-j2\pi vt} dt \right|^2 \quad \text{Eq. (8)}$$

Joint timing and frequency synchronization is then performed in the second stage over a reduced search space to obtain the final estimates of the timing and frequency offsets (block 155). The joint timing and frequency synchronization performed in the second stage is given by:

$$(\hat{\tau}, \hat{v}) = \underset{\tau_{min} \leq \tau \leq \tau_{max}, v'_{min} \leq \hat{v} \leq v'_{max}}{\operatorname{argmax}} \left| \int r(t) \cdot s_1^*(t-\tau) e^{-j2\pi vt} dt \right|^2 \quad \text{Eq. (9)}$$

As shown in Eq. (9) joint estimation in the second stage is performed over a reduced uncertainty window denoted by $[v'_{min} \leq \hat{v} \leq v'_{max}]$. The values $v'_{min}$ and $v'_{max}$ may be computed according to:

$$v'_{min} = \hat{v} - \Delta v \quad \text{Eq. (10)}$$

$$v'_{max} = \hat{v} - -\Delta v \quad \text{Eq. (11)}$$

where $\Delta v$ is a residual uncertainty factor for the frequency uncertainty. The reduced frequency uncertainty window $[v'_{min} \leq \hat{v} \leq v'_{max}]$ may be a single value representing a complete resolution of the frequency offset uncertainty, in which case the residual uncertainty $\Delta v$ equals 0.

Figure 8:
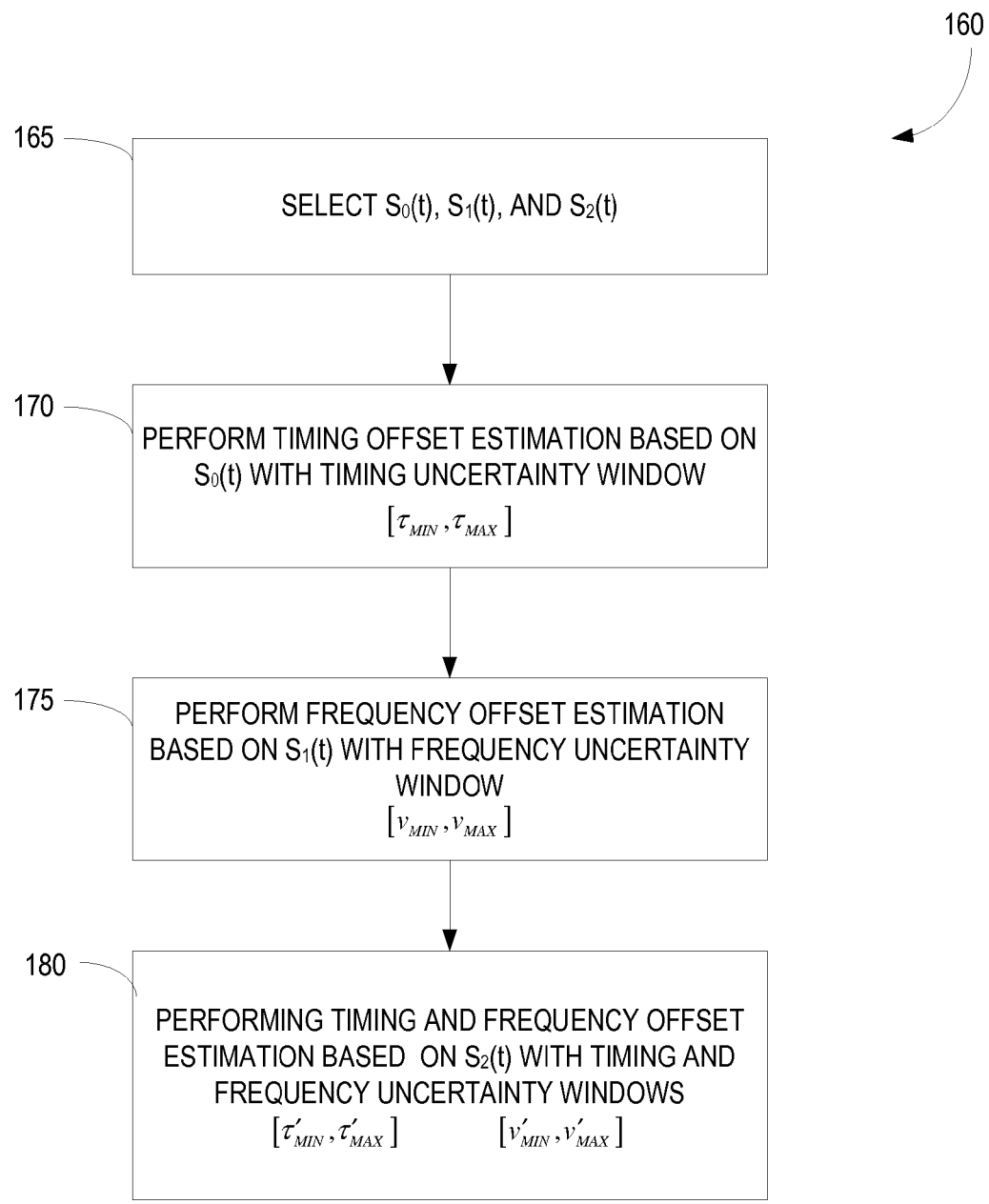
FIG. 8 illustrates a method of timing and frequency synchronization according to one embodiment including a first stage for reducing the timing uncertainty window and a second stage for reducing the frequency uncertainty window.

FIG. 8 shows an exemplary estimation procedure 160 according to another exemplary embodiment. In this embodiment, the estimation process is divided into three stages. In the first stage, timing synchronization is performed using a first subset $s_0(t)$ of reference symbols to narrow the timing uncertainty window. Frequency synchronization is performed in the second stage using a second subset $s_1(t)$ of reference symbols to narrow the frequency uncertainty window. In the third stage, joint timing and frequency synchronization is performed over the reduced search space using a third subset of reference symbols $s_2(t)$ to determine the timing and frequency offset estimates.

The procedure 160 begins with the selection of the first, second, and third reference symbol subsets $s_0(t)$, $s_1(t)$, and $s_2(t)$ (block 165). The first subset of reference symbols $s_0(t)$ may, for example, comprise the reference symbols in the PSS and SSS received over a predetermined period. The second subset of reference symbols $s_1(t)$ may comprise the CSI-RS received over the same period. The third subset of reference symbols $s_2(t)$ may comprise the union of $s_0(t)$ and $s_1(t)$. Timing offset estimation is then performed in the first stage to narrow the timing offset uncertainty window (block 170). The timing offset estimation performed in the first stage is given by:

$$\hat{\tau} = \underset{\tau_{min} \leq \tau \leq \tau_{max}}{\operatorname{argmax}} \sum_j \left| \int r(t) \cdot s_{0,j}^*(t-\tau) dt \right|^2 \quad \text{Eq. (12)}$$

Frequency offset estimation is then performed in the second stage to narrow the frequency offset uncertainty window (block 175). The frequency synchronization performed in the second stage is given by:

$$\hat{v} = \underset{v_{min} \leq v \leq v_{max}}{\operatorname{argmax}} \sum_j \left| \int r(t) \cdot (s_{0,j}^*(t-\hat{\tau}) + s_{1,j}^*(t-\tau)) e^{-j2\pi vt} dt \right|^2 \quad \text{Eq. (13)}$$

Joint timing and frequency synchronization is then performed in the third stage over a reduced search space to obtain the final estimates of the timing and frequency offsets (block 180). The joint timing and frequency offset estimation performed in the third stage is given by:

$$(\hat{\tau}, \hat{v}) = \underset{\tau'_{min} \leq \tau \leq \tau'_{max}, v'_{min} \leq \hat{v} \leq v'_{max}}{\operatorname{argmax}} \left| \int r(t) \cdot s_2^*(t-\tau) e^{-j2\pi vt} dt \right|^2 \quad \text{Eq. (14)}$$

Figure 9:
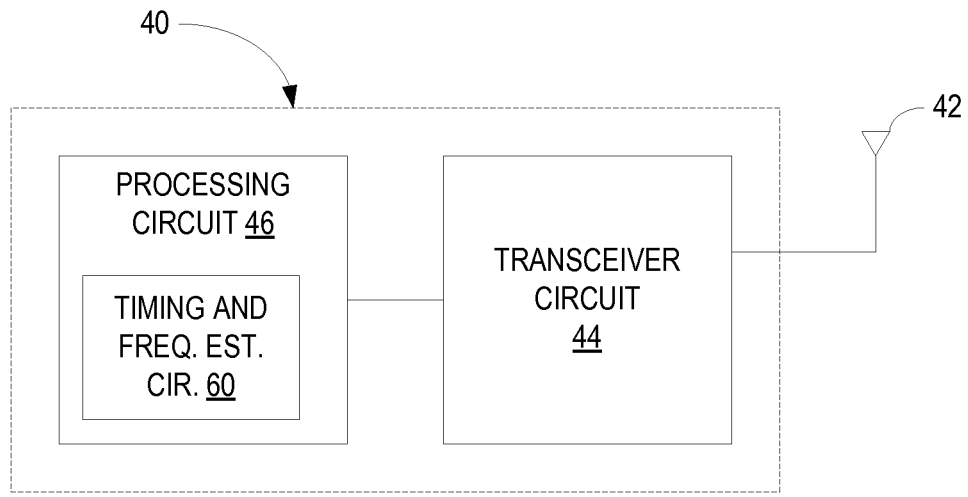
FIG. 9 illustrates an exemplary access terminal configured to perform timing and frequency synchronization as herein described.

FIG. 9 illustrates an exemplary access terminal 40 configured to perform multi-stage timing and frequency offset estimation. The access terminal 40 comprises a transceiver circuit 44 coupled to one or more antennas 42 for communicating with a base station 20, and a processing circuit 46. The transceiver circuit 44 may be configured to operate according to any known communicate standard including without limitation the LTE, WiFi, or WiMAX standards. The processing circuit 46 is configured to process the signals transmitted and received by the transceiver circuit. The processing circuit 46 may comprise one or more processors, hardware, firmware, or a combination thereof. The processing circuit 46 includes a timing and frequency estimation circuit 60 to perform timing and frequency synchronization as herein described.

Figure 10:
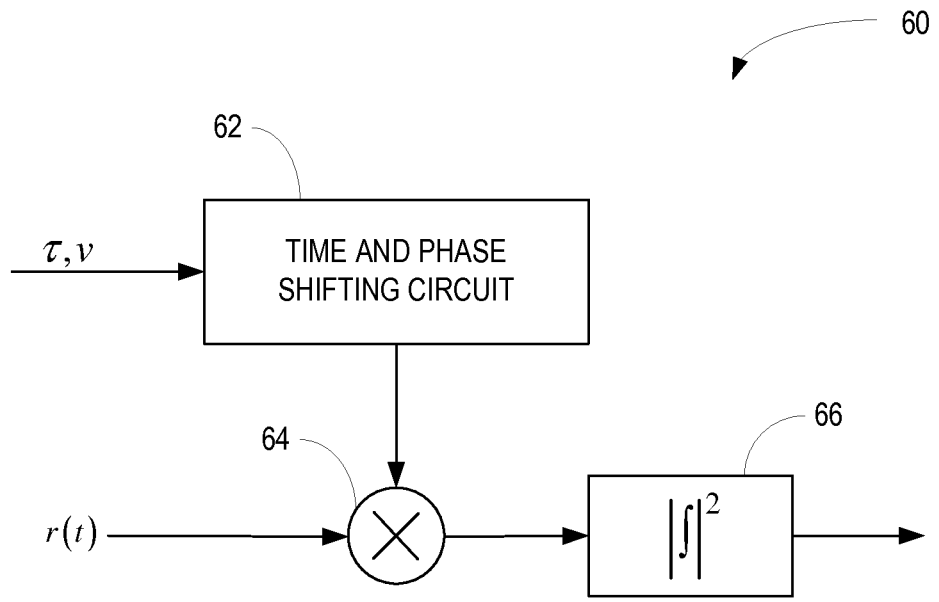
FIG. 10 illustrates an exemplary joint timing and frequency estimator for the access terminal.

FIG. 10 illustrates an exemplary timing and frequency estimation circuit 60. The timing and frequency estimation circuit 60 comprises a time and phase shifting circuit 62, a multiplication circuit 64, and metric calculator 66. The time and phase shifting circuit 62 computes the conjugate of the reference signal shifting in time and/or frequency by a hypothesized amount. The multiplication circuit 64 computes the product of the conjugated reference signal shifted in time and/or frequency, and the received signal. The metric calculator 66 then computes an evaluation metric as a function of the product output by the multiplication circuit 64.

Embodiments of the present can improve the accuracy of timing and frequency offset estimation by using the CSI-RS or other reference signals in combination with the PSS/SSS for timing and frequency synchronization. Reducing the search space for the timing and/or frequency offsets in the non-final stages reduces the complexity of the search.

Thus, the foregoing description and the accompanying drawings represent non-limiting examples of the methods and apparatus taught herein. As such, the present invention is not limited by the foregoing description and accompanying drawings. Instead, the present invention is limited only by the following claims and their legal equivalents.

What is claimed is:

1. A method of synchronizing a receiving device with a transmitting device in a wireless communication network, said method comprising:
   receiving one or more reference signals transmitted by the transmitting device to the receiving device, wherein, as each of the one or more reference signals travels from the transmitting device to the receiving device, each of the one or more reference signals experiences a time offset and a frequency offset;
   reducing a search space for timing and frequency offsets by performing timing offset estimation based on a first set of reference symbols selected from said one or more reference signals, or by performing frequency offset estimation based on a second set of reference symbols selected from said one or more reference signals, or by performing both the timing offset estimation and the frequency offset estimation, wherein the first set of reference symbols and the second set of reference symbols are different; and
   performing joint timing and frequency offset estimation over said reduced search space using a third set of reference symbols selected from said one or more reference signals to obtain estimates of said timing and frequency offsets, wherein the third set of reference symbols is a union of the first and second sets of reference symbols.

2. The method of claim 1 wherein reducing said search space for timing and frequency offsets comprises reducing said search space in a time domain by performing timing offset estimation using said first set of reference symbols to obtain said reduced search space.

3. The method of claim 2 wherein performing timing offset estimation using said first set of reference symbols comprises performing timing offset estimation using reference symbols selected from one or more synchronization signals.

4. The method of claim 3 wherein performing joint timing and frequency offset estimation comprises performing timing and frequency offset estimation using reference symbols selected from one or more channel state information (CSI) reference signals, one or more synchronization signals, or both.

5. The method of claim 1 wherein reducing said search space for timing and frequency offsets comprises reducing said search space in a frequency domain by performing frequency offset estimation using said second set of reference symbols to obtain said reduced search space.

6. The method of claim 5 wherein performing frequency offset estimation using said second set of reference symbols comprises performing frequency offset estimation using reference symbols selected from one or more channel state information (CSI) reference signals.

7. The method of claim 6 wherein performing joint timing and frequency offset estimation comprises performing timing and frequency offset estimation using reference symbols selected from one or more synchronization signals, one or more channel state information (CSI) reference signals, or both.

8. The method of claim 1 wherein reducing said search space for timing and frequency offsets comprises:
   reducing said search space in a time domain by performing timing offset estimation using said first set of reference symbols; and
   reducing said search space in a frequency domain by performing frequency offset estimation using said second set of reference symbols.

9. The method of claim 8 wherein:
   performing timing offset estimation using said first set of reference symbols comprises performing timing offset estimation using reference symbols selected from one or more synchronization signals;
   performing frequency offset estimation using said second set of reference symbols comprises performing frequency offset estimation using reference symbols selected from one or more channel state information reference signals; and
   performing joint timing and frequency offset estimation comprises performing timing and frequency offset estimation using reference symbols selected from one or more channel state information (CSI) reference signals, one or more synchronization signals, or both.

10. An access terminal comprising:
    a transceiver circuit for receiving one or more reference signals from a base station, wherein, as each of the one or more reference signals travels from the transmitting device to the receiving device, each of the one or more reference signals experiences a time offset and a frequency offset; and
    a processing circuit to perform timing and frequency synchronization, said processing circuit being configured to:
    reduce a search space for timing and frequency offsets by performing timing offset estimation based on a first set of reference symbols selected from said one or more reference signals, or by performing frequency offset estimation based on a second set of reference symbols selected from said one or more reference signals, or by performing both the timing offset estimation and the frequency estimation, wherein the first set of reference symbols and the second set of reference symbols are different; and
    perform joint timing and frequency offset estimation over said reduced search space using a third set of reference symbols selected from said one or more reference signals to obtain estimates of said timing and frequency offsets, wherein the third set of reference symbols is a union of the first and second sets of reference symbols.

11. The access terminal of claim 10 wherein said processing circuit is further configured to reduce said search space in a time domain by performing timing offset estimation using said first set of reference symbols to obtain said reduced search space.

12. The access terminal of claim 11 wherein said processing circuit is configured to perform said timing offset estimation using reference symbols selected from one or more synchronization signals.

13. The access terminal of claim 12 wherein said processing circuit is configured to perform said timing and frequency offset estimation using reference symbols selected from one or more channel state information (CSI) reference signals, one or more synchronization signals, or both.

14. The access terminal of claim 10 wherein said processing circuit is configured to reduce said search space in a frequency domain by performing frequency offset estimation using said second set of reference symbols to obtain said reduced search space.

15. The access terminal of claim 14 wherein said processing circuit is configured to perform frequency offset estimation using said second set of reference symbols by performing frequency offset estimation using reference symbols selected from one or more channel state information (CSI) reference signals.

16. The access terminal of claim 15 wherein said processing circuit is configured to perform said timing and frequency offset estimation using reference symbols selected from one or more synchronization signals, one or more channel state information (CSI) reference signals, or both.

17. The access terminal of claim 10 wherein said processing circuit is configured to reduce said search space in both timing and frequency domains by performing timing offset estimation using said first set of reference symbols and frequency offset estimation using said second set of reference signals.

18. The access terminal of claim 17 wherein said processing circuit is configured to:
   perform said timing offset estimation using reference symbols selected from one or more synchronization signals;
   perform said frequency offset estimation using reference symbols selected from one or more channel state information reference signals; and
   perform said joint timing and frequency offset estimation using reference symbols selected from one or more channel state information (CSI) reference signals, one or more synchronization signals, or both.

* * * * *